W. H. DAVIS.
JOINT FOR PACKING BOX BOARDS.
APPLICATION FILED JAN. 22, 1915.

1,219,538.

Patented Mar. 20, 1917.

Witnesses:
Walter F. Stone.
M. K. Klant.

Inventor:
William Harry Davis,
By Rummler & Rummler,
Attys.

UNITED STATES PATENT OFFICE.

WILLIAM HARRY DAVIS, OF WINNETKA, ILLINOIS.

JOINT FOR PACKING-BOX BOARDS.

1,219,538.  Specification of Letters Patent. Patented Mar. 20, 1917.

Application filed January 22, 1915. Serial No. 3,824.

*To all whom it may concern:*

Be it known that I, WILLIAM HARRY DAVIS, a citizen of the United States of America, and a resident of Winnetka, county of Cook, and State of Illinois, have invented certain new and useful Improvements in Joints for Packing-Box Boards, of which the following is a specification.

The main objects of this invention are to provide an improved joint for boards for use in wooden packing cases; to provide a joint of this nature whereby pieces or strips of veneer or other thin wood of various widths may be connected edge to edge so that the resulting board may serve as a complete bottom, top or side of a packing case and may have all of the advantages of a single board of the required width, including substantially uniform thickness throughout its area, air-and-dust-tightness, and convenience and economy in handling, shipping, and assembling the component parts or shooks from which packing cases are made up.

The increase in cost of raw materials has compelled manufacturers of packing cases to gradually reduce the quality and thickness of the lumber used. It is essential that a packing box be amply strong to insure the safe transmission of its contents to the ultimate consumer and to withstand the wear and tear to which it is likely to be subjected, but any excess of strength may be regarded as waste and results in unnecessary expense to the consumer.

These circumstances have led to the making of wide boards, such as box bottoms, by connecting narrower boards edge to edge. In packing cases for food products, such for example as cracker boxes where dust-and-moisture-tightness are essential, it has been customary to use tongue and groove matching in joining such narrower boards, but the reduction in thickness of the boards and the use of veneers one-quarter of an inch in thickness for this purpose has rendered this form of joint undesirable. When boards of this thickness are matched, particularly if they be veneers, the tongues and sides of the grooves are so thin that they readily split off and splinter; and this, together with the warping and distortion which is bound to take place in such thin lumber, has given rise to much trouble and has increased considerably the expense of assembling the boxes, so that much that is saved by using the thinner stock is afterward lost by the increased labor cost. If in shipping the shooks for such packing boxes, the narrow boards making up the wide boards become separated, the assembler of the boxes finds considerable difficulty in putting the boards together again, and usually has to resort to sliding the tongues endwise into the grooves of the companion boards which, besides being a slow operation, is difficult because of the thinness and roughness of the matched edges. Attempts to avoid these difficulties have given rise to gluing the tongue and groove joints, but this adds still further expense to the cost, and still further tends to offset the economy of using thin lumber.

The present invention overcomes these difficulties and objections, and provides a joint which is sufficiently impervious to dust and moisture for use in packages for food products. It contemplates abutting the unmatched edges of boards, securing them rigidly together at intervals along their length by means of suitable flush metal fasteners, and then sealing the joint with tape.

An illustrative embodiment of this invention is shown in the accompanying drawings, in which—

Figures 1, 2:
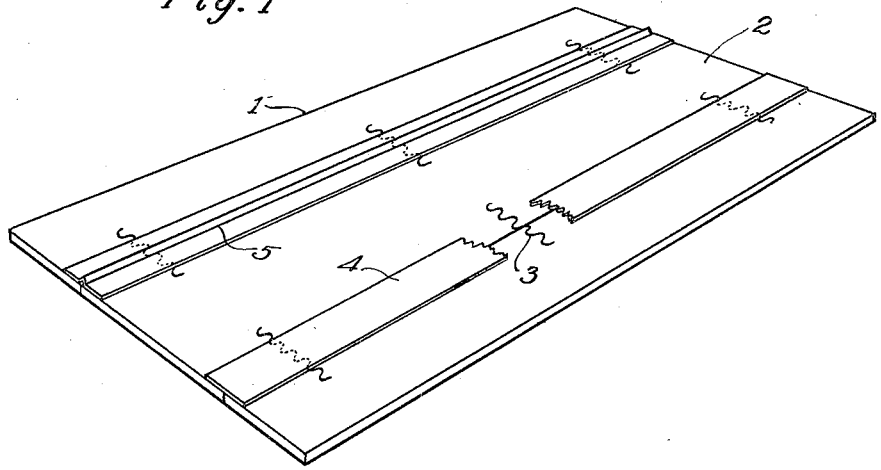
Figure 1 is a perspective view of a box bottom made up of several pieces connected together by the improved joint.
Fig. 2 is a sectional detail of the joint.

In the form shown, the box board 1, which may represent a side, bottom or top of a box, comprises a plurality of narrow pieces 2 of lumber joined together by suitable rigid and flush fasteners, preferably corrugated metal fasteners 3 placed so as to cross the joint and driven into the adjoining parts of the board sections. The metal fasteners are driven flush with the face of the board and are of a length approximately equal to the thickness of the board. A strip of tape 4 is then pasted along the joint to close the joint and cover the fasteners. In assembling the boxes, the tape should be on the inside. This tape, as shown in the drawings, may to advantage be provided with a corrugation or crease 5 running lengthwise thereof, thus permitting it to accommodate itself to warping or distortion of the board sections without splitting or becoming loosened therefrom.

The metal fasteners tend to minimize the warping of the board sections and rigidly fasten together the abutting edges of adjacent pieces, and when they are used in combination with a tape, as in the present case, there is provided a joint which may be utilized in a class of packing cases in which heretofore it was invariably found necessary to use single wide board or boards made up of pieces having interfitting matched joints.

Although but one specific embodiment of this invention has been herein shown and described, it will be understood that some of the details of the construction shown may be altered or omitted without departing from the spirit of this invention as defined by the following claims.

I claim:

1. A board comprising pieces of veneer wood placed with edges abutting, metal fasteners spanning the joint and driven transversely to the plane of the board, and a tape extending along and covering said joint.

2. A board comprising pieces of veneer wood placed with edges abutting, corrugated metal fasteners spanning the joint and driven transversely to the plane of the board, and a tape extending along and covering said joint.

Signed at Chicago this 13th day of January, 1915.

W. HARRY DAVIS.

Witnesses:
EUGENE A. RUMMLER,
M. IRENE HUTCHINGS.

Copies of this patent may be obtained for five cents each, by addressing the "Commissioner of Patents, Washington, D. C."